United States Patent
Lim

(10) Patent No.: US 12,244,042 B2
(45) Date of Patent: Mar. 4, 2025

(54) AIR SUPPLY SYSTEM AND AIR SUPPLY METHOD FOR FUEL CELL

(71) Applicants: HYUNDAI MOTOR COMPANY, Seoul (KR); KIA CORPORATION, Seoul (KR)

(72) Inventor: Hye Su Lim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 360 days.

(21) Appl. No.: 17/845,053

(22) Filed: Jun. 21, 2022

(65) Prior Publication Data

US 2023/0030199 A1 Feb. 2, 2023

(30) Foreign Application Priority Data

Jul. 23, 2021 (KR) .................. 10-2021-0097375

(51) Int. Cl.

| | |
|---|---|
| *H01M 8/04* | (2016.01) |
| *B60H 1/00* | (2006.01) |
| *H01M 8/04014* | (2016.01) |
| *H01M 8/04029* | (2016.01) |
| *H01M 8/04082* | (2016.01) |
| *H01M 8/04119* | (2016.01) |
| *H01M 8/04225* | (2016.01) |
| *H01M 8/04302* | (2016.01) |
| *H01M 8/0432* | (2016.01) |

(Continued)

(52) U.S. Cl.
CPC .... *H01M 8/04201* (2013.01); *B60H 1/00278* (2013.01); *H01M 8/04014* (2013.01); *H01M 8/04029* (2013.01); *H01M 8/04126* (2013.01); *H01M 8/04225* (2016.02); *H01M 8/04302* (2016.02); *H01M 8/04335* (2013.01); *H01M 8/04708* (2013.01); *H01M 8/04992* (2013.01); *H01M 2250/20* (2013.01)

(58) Field of Classification Search
CPC ......... H01M 8/04201; H01M 8/04225; H01M 8/04302
See application file for complete search history.

(56) References Cited

U.S. PATENT DOCUMENTS

2018/0236894 A1* 8/2018 Bandai .............. H01M 8/04074
2021/0376352 A1* 12/2021 Watanabe ................ B60L 1/02

FOREIGN PATENT DOCUMENTS

| JP | 2008-262852 A | 10/2008 |
|---|---|---|
| JP | 6578988 B2 | 9/2019 |

OTHER PUBLICATIONS

Extended European search report issued on Dec. 9, 2022, in counterpart European Patent Application No. 22180285.3 (8 pages in English).

* cited by examiner

*Primary Examiner* — Olatunji A Godo
(74) *Attorney, Agent, or Firm* — MORGAN, LEWIS & BOCKIUS LLP

(57) ABSTRACT

There is provided an air supply system and method for a fuel cell, the air supply system includes an air supply device configured to reduce a temperature of compressed air using heat exchange air and to provide the cooled air as power generation air to a fuel cell stack, and an indoor temperature adjustment device configured to provide external air as the heat exchange air to the air supply device or to cool the external air to provide the cooled external air as the heat exchange air to the air supply device, based on operation control information.

9 Claims, 3 Drawing Sheets

(51) Int. Cl.
*H01M 8/04701* (2016.01)
*H01M 8/04992* (2016.01)

AIR SUPPLY SYSTEM AND AIR SUPPLY METHOD FOR FUEL CELL

CROSS-REFERENCE TO RELATED APPLICATION

This application claims the benefit under 35 USC § 119(a) of Korean Patent Application No. 10-2021-0097375, filed in the Korean Intellectual Property Office on Jul. 23, 2021, the entire disclosure of which is incorporated herein by reference for all purposes.

BACKGROUND

1. Field

The present disclosure relates to an air supply system and air supply method which supplies air to supply oxygen to a fuel cell.

2. Description of Related Art

Fuel cells receive air and hydrogen and generate electric energy using hydrogen and oxygen contained in the air.

In this case, the air supplied to the fuel cell is compressed external air, and only when a temperature and a humidity are maintained within a specific range, electric energy generation efficiency may be improved.

Thus, to improve the efficiency of the fuel cell, there is an urgent need to develop an air supply system for supplying the air to the fuel cell.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an air supply system for a fuel cell, the air supply system including an air supply device configured to reduce a temperature of compressed air using heat exchange air and to provide the cooled air as power generation air to a fuel cell stack, and an indoor temperature adjustment device configured to provide external air as the heat exchange air to the air supply device or to cool the external air to provide the cooled external air as the heat exchange air to the air supply device, based on operation control information.

The air supply device may include an air compressor configured to compress the external air, an air cooler configured to cool the air compressed by the air compressor using cooling water, and a heat exchanger configured to cool the air cooled by the air cooler using the heat exchange air.

The air supply device further may include an air filter configured to remove a pollutant from the external air and to provide, to the air compressor, the external air from which the pollutant source is removed, and a humidifier configured to add moisture to the air cooled by the heat exchanger and to provide, to the fuel cell stack, the air to which the moisture is added.

The indoor temperature adjustment device may include a condenser, an expansion valve, an evaporator, and a compressor of which operations are determined based on the operation control information.

The indoor temperature adjustment device further may include a blower motor configured to suck the external air, and a distributor configured to provide, to the air supply device, the external air sucked by the blower motor or the external air cooled by the evaporator as the heat exchange air.

The air supply system may include a controller configured to generate the operation control information based on a temperature of the air cooled by the air cooler, a temperature of the air cooled by the heat exchanger, heat transfer efficiency of the heat exchanger, and a temperature of the external air.

The controller may be configured to determine whether a temperature of the power generation air is reduced to a temperature needed by the fuel cell stack only using the external air based on the temperature of the air cooled by the air cooler, the temperature of the air cooled by the heat exchanger, the heat transfer efficiency of the heat exchanger, and the temperature of the external air, and to provide a result of the determination as the operation control information to the indoor temperature adjustment device.

The controller may be configured to determine that the temperature of the power generation air is not cooled to a temperature needed by the fuel cell stack only using the external air, in response to the temperature of the external air exceeding a value of the following formula $T_{ACL,out} - 1/\eta * (T_{ACL,out} - T_{AHF,in})$, wherein $\eta$ is the heat transfer efficiency of the heat exchanger, $T_{ACL,out}$ is the temperature of the air cooled by the air cooler, and $T_{AHF,in}$ is the temperature of the air cooled by the heat exchanger, and to generate the operation control information so that the external air is cooled and provided as the heat exchange air to the air supply device.

The controller may be configured to determine that the temperature of the power generation air is cooled to the temperature needed by the fuel cell stack only using the external air, in response to the temperature of the external air being less than or equal to the value of the following formula $T_{ACL,out} - 1/\eta * (T_{ACL,out} - T_{AHF,in})$, and to generate the operation control information so that the external air is provided as the heat exchange air to the air supply device.

In another general aspect, there is provided a processor-implemented air supply method for a fuel cell, the method including identifying whether a vehicle is started up, supplying heat exchange air to an air supply device, in response to the startup of the vehicle being identified, determining whether a cooling condition of the heat exchange air is satisfied, supplying the heat exchange air having a temperature lower than that of external air to the air supply device by operating a vehicle air conditioner, in response to the cooling condition of the heat exchange air being satisfied, and determining whether the vehicle is started up, in response to the supplying of the heat exchange air having the temperature lower than that of the external air.

The air supply device may include an air compressor configured to compress the external air, an air cooler configured to cool the air compressed by the air compressor using cooling water, and a heat exchanger configured to cool the air cooled by the air cooler using the heat exchange air and provide the cooled air to a fuel cell stack.

The determining of whether the cooling condition of the heat exchange air is satisfied may include determining whether the cooling condition of the heat exchange air is satisfied based on a temperature of the air cooled by the air cooler, a temperature of the air cooled by the heat exchanger, heat transfer efficiency of the heat exchanger, and a temperature of the external air.

The determining of whether the cooling condition of the heat exchange air is satisfied may include supplying the heat exchange air having a temperature lower than that of the external air to the air supply device, in response to the temperature of the external air exceeds a value of the following formula $T_{ACL,out} - 1/\eta * (T_{ACL,out} - T_{AHF,in})$, wherein $\eta$ is the heat transfer efficiency of the heat exchanger, $T_{ACL,out}$ is the temperature of the air cooled by the air cooler, and $T_{AHF,in}$ is the temperature of the air cooled by the heat exchanger.

The determining of whether the cooling condition of the heat exchange air is satisfied further may include supplying the external air as the heat exchange air to the air supply device, in response to the temperature of the external air being less than or equal to the value of the following formula $T_{ACL,out} - 1/\eta * (T_{ACL,out} - T_{AHF,in})$.

Other features and aspects will be apparent from the following detailed description, the drawings, and the claims.

Figure 1:
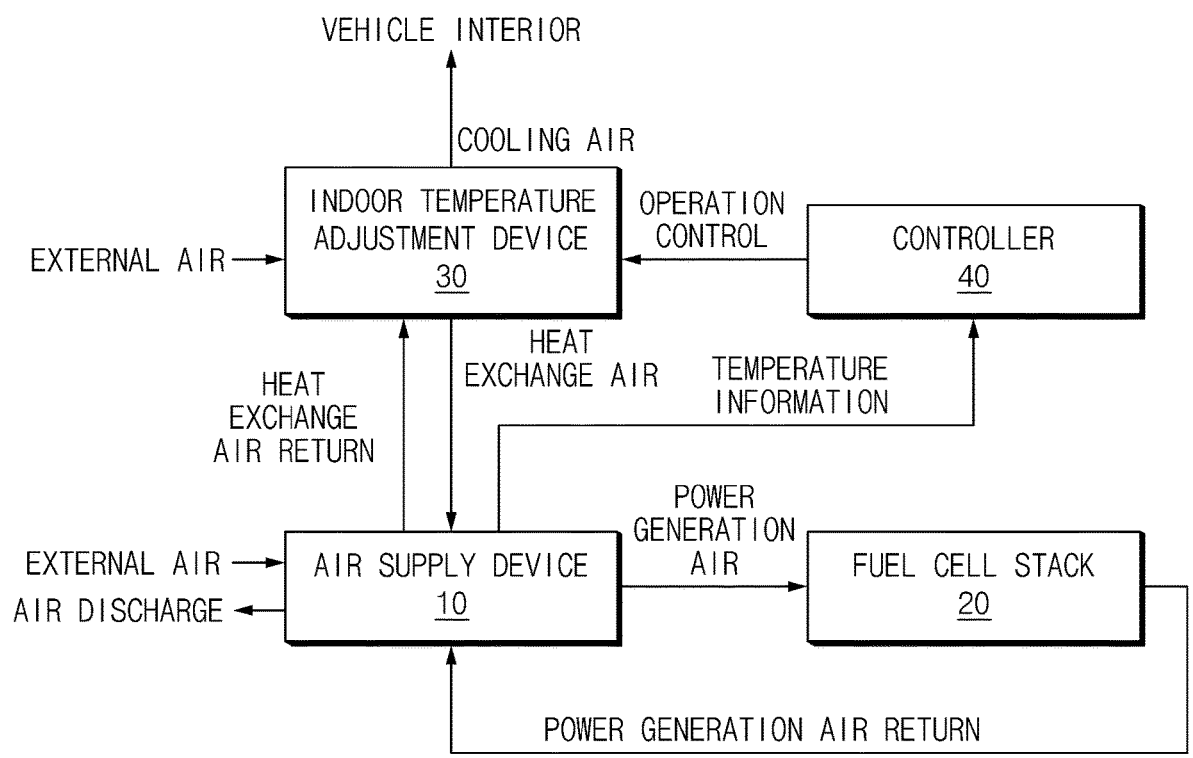
FIG. 1 is a view illustrating a configuration of an air supply system for a fuel cell according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there maybe one or more other components intervening therebetween. In contrast, when an element is described as being "directly connected to," or "directly coupled to" another element, there can be no other elements intervening therebetween.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third," A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 3.

FIG. 1 is a view illustrating a configuration of an air supply system for a fuel cell according to an embodiment of the present disclosure.

Referring to FIG. 1, an air supply device 10, a fuel cell stack 20, an indoor temperature adjustment device 30, and a controller 40 of the air supply system according to an embodiment of the present disclosure may be implemented inside a vehicle. In this case, the controller 40 may be formed integrally with internal controllers of the vehicle or may be implemented as a separate device and connected to the controllers of the vehicle through a separate connection part.

Referring to FIG. 1, the air supply system for a fuel cell according to an embodiment of the present disclosure may include the air supply device 10, the fuel cell stack 20, the indoor temperature adjustment device 30, and the controller 40.

The air supply device 10 may suck and compress external air, reduce a temperature of the compressed air using heat exchange air provided from the indoor temperature adjustment device 30, and provide the air as power generation air to the fuel cell stack 20.

In this case, the air supply device 10 may discharge, to the outside, the power generation air returning from the fuel cell stack 20, that is, a part of humid air having high humidity, to adjust the pressure inside the fuel cell stack 20 and may return, to the indoor temperature adjustment device 30, the heat exchange air used to reduce the temperature of the power generation air.

Further, the air supply device 10 may provide, to the controller 40, temperature information corresponding to the temperature of internal air of the air supply device 10.

The fuel cell stack 20 may generate electric energy by reacting oxygen contained in the power generation air provided from the air supply device 10 and hydrogen provided from a hydrogen storage device (not illustrated).

In this case, to increase electric energy production efficiency of the fuel cell stack 20, the air supply device 10 may provide, to the fuel cell stack 20, the power generation air that satisfies a preset temperature range and satisfies a preset relative humidity.

For example, the power generation air provided to the fuel cell stack 20 may be adjusted by the air supply device 10 such that the temperature of the power generation air is maintained within a range from 60 degrees to 70 degrees and the relative humidity thereof is maintained within a range from 25% to 50%.

The indoor temperature adjustment device 30 may suck the external air and cool or heat the sucked air.

In this case, the indoor temperature adjustment device 30 according to an embodiment of the present disclosure may include a vehicle air conditioner as a device that sucks the external air, cools the sucked air, and provides the cooled air to at least one of a vehicle interior or the air supply device 10.

Further, the indoor temperature adjustment device 30 may provide the sucked external air as the heat exchange air to the air supply device 10 according to operation control information provided from the controller 40 and cool the sucked air to provide the cooled air as the heat exchange air to the air supply device 10.

When the external air sucked by the indoor temperature adjustment device 30 is provided to the vehicle interior, the air provided to the vehicle interior is illustrated as cooling air in FIG. 1.

Meanwhile, when the external air sucked by the indoor temperature adjustment device 30 is provided to the air supply device 10, the air provided to the air supply device 10 is illustrated as the heat exchange air in FIG. 1.

The controller 40 may generate the operation control information for determining whether to perform a cooling operation of the indoor temperature adjustment device 30, on the basis of the temperature information provided from the air supply device 10.

In this case, when the cooling operation of the indoor temperature adjustment device 30 is performed by the controller 40, the air supply device 10 may receive the heat exchange air obtained by cooling the external air.

Meanwhile, when the cooling operation of the indoor temperature adjustment device 30 is stopped by the controller 40, the air supply device 10 may receive the external air as the heat exchange air.

A detailed configuration of the air supply system for a fuel cell according to an embodiment of the present disclosure as configured above will be described below in detail with reference to FIG. 2.

Figure 2:
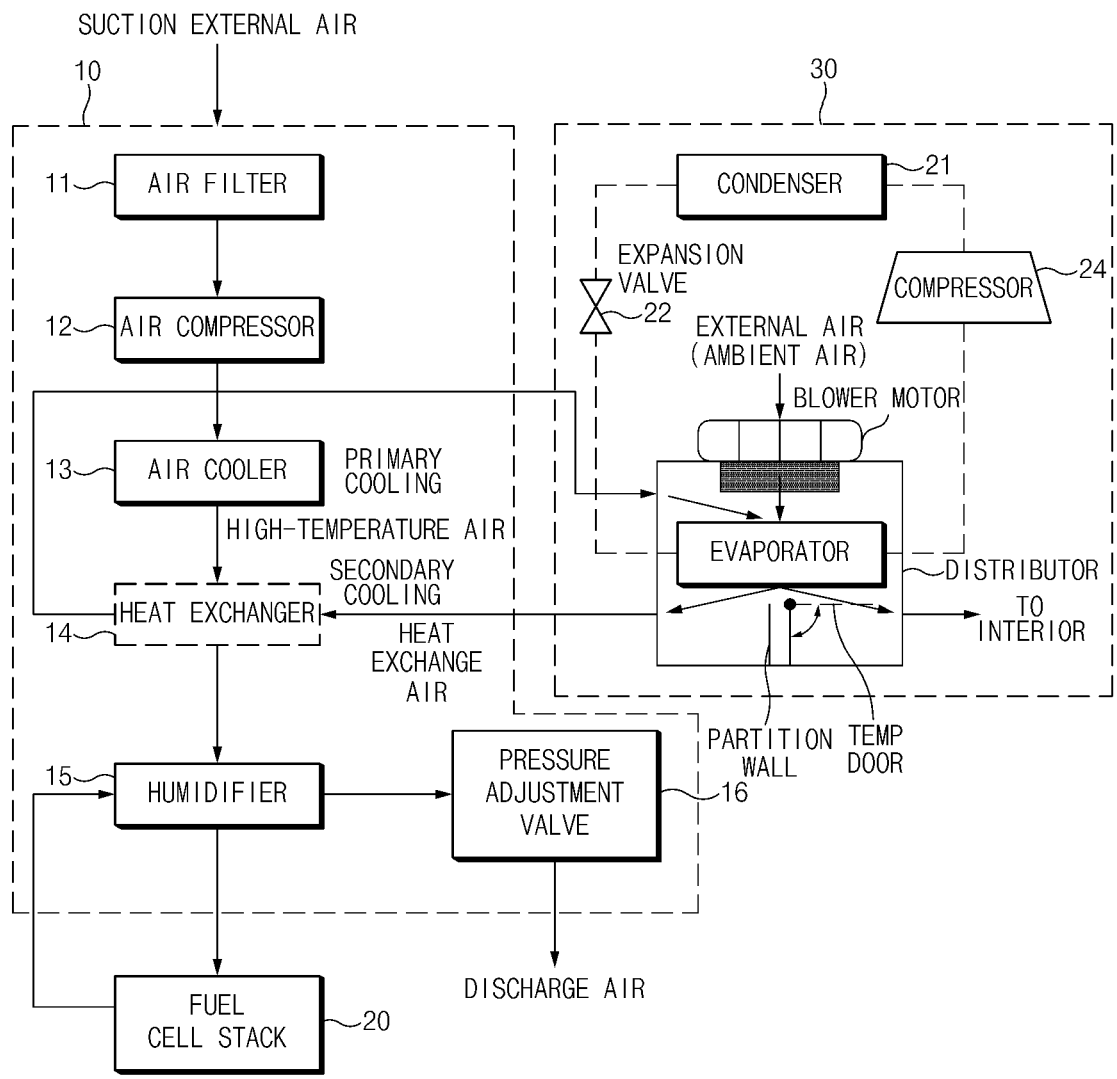
FIG. 2 is a view illustrating configurations of an air supply device and an indoor temperature adjustment device constituting the air supply system for a fuel cell according to an embodiment of the present disclosure.

FIG. 2 is a view illustrating configurations of an air supply device and an indoor temperature adjustment device constituting the air supply system for a fuel cell according to an embodiment of the present disclosure.

Referring to FIG. 2, the air supply device 10 may include an air filter 11, an air compressor 12, an air cooler 13, a heat exchanger 14, a humidifier 15, and a pressure adjustment valve 16.

The air filter 11 may remove a pollutant source of the sucked external air and provide, to the air compressor 12, the air from which the pollutant source is removed.

The air compressor 12 may compress the air provided from the air filter 11 and provide the compressed air to the air cooler 13.

In this case, the air compressed by the air compressor 12 may be high-temperature air, the temperature of which is high.

The air cooler 13 may primarily cool, using cooling water, the high-temperature compressed air provided from the air compressor 12. In this case, the temperature of the air provided from the air cooler 13 to the heat exchanger 14 may be provided as the temperature information to the controller 40.

The heat exchanger 14 may secondarily cool the air primarily cooled by the air cooler 13 using the heat exchange air provided from the indoor temperature adjustment device 30.

The humidifier 15 may supply moisture to the air secondarily cooled by the heat exchanger 14. In this case, the temperature of the air provided from the heat exchanger 14 to the humidifier 15 may be provided as the temperature information to the controller 40.

Further, the air to which the moisture is supplied by the humidifier 15 may be provided to the fuel cell stack 20. The air supplying oxygen thereof to the fuel cell stack 20 may be sucked back into the humidifier 15 and supply the moisture to the humidifier 15.

The air supplying the moisture thereof to the humidifier 15 may be provided to the pressure adjustment valve 16, and the pressure adjustment valve 16 may discharge, to the outside, the air provided from the humidifier 15.

The indoor temperature adjustment device 30 may include a condenser 21, an expansion valve 22, an evaporator 23, and a compressor 24. In this case, the indoor temperature adjustment device 30 may further include a blower motor for supplying the external air to the evaporator 23 and a distributor for providing the air cooled by the evaporator 23 or the air sucked from the blower motor to at least one of the vehicle interior and the heat exchanger 14 of the air supply device 10.

The condenser 21 may release heat of high-temperature and high-pressure gas compressed by the compressor 24 to liquefy the high-temperature and high-pressure gas provided from the compressor 24.

The expansion valve 22 may reduce the pressure of the low-temperature and high-pressure liquid from which heat is released by the condenser 21, to generate a low-temperature and low-pressure liquid.

The evaporator 23 may evaporate a low-temperature and low-pressure liquid (a refrigerant) of which the pressure is reduced by the expansion valve 22.

The compressor 24 may compress the gas evaporated by the evaporator 23 to generate the high-temperature and high-pressure gas so as to provide the high-temperature and high-pressure gas to the condenser 21.

In this case, when the liquid (refrigerant) is evaporated by the evaporator 23, the vaporized liquid (refrigerant) absorbs the heat of the external air sucked by the blower motor. Thus, the external air sucked by the blower motor may be cooled and provided to at least one of the heat exchanger 14 of the air supply device 10 and the vehicle interior through the distributor.

The distributor having a partition wall installed therein may distribute the air cooled by the evaporator 23 or the air sucked by the blower motor to the heat exchanger 14 and the vehicle interior.

Further, a temp door is installed inside the distributor, and the amount of air transferred to the vehicle interior, that is, cooling air, may be adjusted according to the opening amount of the temp door.

In this case, the air supply system for a fuel cell according to an embodiment of the present disclosure may always operate the blower motor of the indoor temperature adjustment device 30 and control whether the condenser 21, the expansion valve 22, the evaporator 23, and the compressor 24 are operated, that is, whether the cooling operation is operated (is turned on or off), using the operation control information generated by the controller 40.

That is, the external air sucked by the indoor temperature adjustment device 30 may be always provided as the heat exchange air to the air supply device 10, and the controller 40 may determine whether the condenser 21, the expansion valve 22, the evaporator 23, and the compressor 24 are operated, to adjust the temperature of the heat exchange air provided to the air supply device 10.

For example, according to the operation control information of the controller 40, the indoor temperature adjustment device 30 may provide the sucked external air as the heat exchange air to the heat exchanger 14 of the air supply device 10 or cool the sucked external air to provide the cooled air as the heat exchange air to the heat exchanger 14 of the air supply device 10.

As a result, the controller 40 may determine whether the indoor temperature adjustment device 30 performs a cooling operation, to adjust the temperature of the heat exchange air provided to the heat exchanger 14 of the air supply device 10.

In this case, the controller 40 may receive, as temperature information, the temperature of the air provided from the air cooler 13 to the heat exchanger 14 and the temperature of the air provided from the heat exchanger 14 to the humidifier 15.

The controller 40 may determine whether the indoor temperature adjustment device 30 performs a cooling operation on the basis of the temperature information (the temperature of the air provided from the air cooler 13 to the heat exchanger 14 and the temperature of the air provided from the heat exchanger 14 to the humidifier 15), the heat transfer efficiency of the heat exchanger 14, and the temperature of the external air.

An operation of the air supply system for a fuel cell according to an embodiment of the present disclosure as configured above will be described below in detail.

When the vehicle is started up, the indoor temperature adjustment device 30 may provide the external air that is not cooled, that is, sucked, as the heat exchange air to the air supply device 10.

The air supply device 10 may suck and compress the external air, primarily cool the air, of which the temperature is increased due to the compression, using the air cooler 13, secondarily cool the air using the heat exchanger 14, and provide the air as the power generation air to the fuel cell stack 20.

In this case, the heat exchange air provided to the air supply device 10 by the indoor temperature adjustment device 30 may be the external air sucked by the blower motor not the air cooled through the cooling operation.

That is, after the vehicle is started up, the heat exchanger 14 of the air supply device 10 may secondarily cool the air provided from the air cooler 13 using the external air sucked by the blower motor and provide the cooled air to the humidifier 15.

Thereafter, the controller 40 may determine whether the indoor temperature adjustment device 30 performs the cooling operation on the basis of the temperature of the air primarily cooled by the air cooler 13, the temperature of the air secondarily cooled by the heat exchanger 14, the temperature of the external air, and the heat transfer efficiency of the heat exchanger 14.

That is, when it is determined that, in the heat exchanger 14, the heat exchange air having the temperature of the external air does not satisfy a power generation air temperature range required by the fuel cell stack 20 on the basis of the temperature of the air primarily cooled by the air cooler 13, the temperature of the air secondarily cooled by the heat exchanger 14, and the temperature of the external air, the controller 40 may generate the operation control information so that the indoor temperature adjustment device 30 performs the cooling operation. In this case, the operation control information generated from the controller 40 may be provided to the indoor temperature adjustment device 30.

The controller 40 may generate the operation control information for performing a cooling operation of the indoor temperature adjustment device 30 when $T_{Ambient} > T_{ACL,out} - 1/\eta^*(T_{ACL,out} - T_{AHF,in})$ is satisfied and may generate the operation control information for stopping the cooling operation of the indoor temperature adjustment device 30 when $T_{Ambient} \leq T_{ACL,out} - 1/\eta^*(T_{ACL,out} - T_{AHF,in})$ is satisfied.

In this case, $T_{Ambient}$ may mean the temperature of the external air, $\eta$ may mean the heat transfer efficiency of the heat exchanger 14, $T_{ACL,out}$ may mean the temperature of the air output from the air cooler 13, and $T_{AHF,in}$ may mean the temperature of the air provided to the humidifier 15 and the heat transfer efficiency of the heat exchanger 14 may be a value preset during the design.

The formulas $T_{Ambient} > T_{ACL,out} - 1/\eta^*(T_{ACL,out} - T_{AHF,in})$ and $T_{Ambient} \leq T_{ACL,out} - 1/\eta^*(T_{ACL,out} - T_{AHF,in})$ for determining whether the controller 40 performs the cooling operation of the indoor temperature adjustment device 30 may be formulas derived from a formula for calculating the heat transfer efficiency of the heat exchanger 14.

The heat transfer efficiency $f$ of the heat exchanger 14 may be defined as (actual heat transfer rate)/(maximum possible heat transfer rate), and $T_{Ambient} = T_{ACL,out} - 1/\eta^*(T_{ACL,out} - T_{AHF,in})$ may be expressed.

When the formula for calculating the heat transfer efficiency of the heat exchanger 14 is arranged for the temperature $T_{Ambient}$ of the external air, the formula may be arranged in $T_{Ambient} = T_{ACL,out} - 1/\eta^*(T_{ACL,out} - T_{AHF,in})$. In this case, the heat transfer efficiency may be a preset value at the time of design.

Thus, when the temperature $T_{Ambient}$ of the external air exceeds a value of $T_{ACL,out} - 1/\eta^*(T_{ACL,out} - T_{AHF,in})$, the controller 40 may determine that the heat exchanger 14 does not satisfy the temperature of the power generation air required by the fuel cell stack 20 using the external air and may generate the operation control information for performing the cooling operation of the indoor temperature adjustment device 30.

Meanwhile, when the temperature $T_{Ambient}$ of the external air is less than or equal to the value of $T_{ACL,out} - 1/\eta^*(T_{ACL,out} - T_{AHF,in})$, the controller 40 may determine that the heat exchanger 14 satisfies the temperature of the power generation air required by the fuel cell stack 20 using the external air and may generate the operation control information for stopping the cooling operation of the indoor temperature adjustment device 30.

As a result, in the air supply system for a fuel cell according to an embodiment of the present disclosure, since the compressed air provided to the fuel cell stack 20 is primarily cooled by the air cooler 13 and is secondarily cooled by the heat exchanger 14, the temperature of the compressed air may be reduced as much as the temperature required by the fuel cell stack 20, and thus power generation efficiency of the fuel cell stack 20 may be improved.

In addition, in the air supply system for a fuel cell according to an embodiment of the present disclosure, when the secondarily cooled air does not satisfy the required temperature of the power generation air of the fuel cell stack 20 only using the external air in the heat exchanger 14, the cooling operation of the indoor temperature adjustment device 30 (that is, an air conditioner) is performed, and thus the heat exchanger 14 may be controlled to receive air having alower temperature than the external air.

Thus, in the air supply system for a fuel cell according to an embodiment of the present disclosure, the temperature of the power generation air required by the fuel cell stack 20 is satisfied regardless of the temperature of the external air, and thus the power generation efficiency of the fuel cell stack 20 may be improved.

Figure 3:
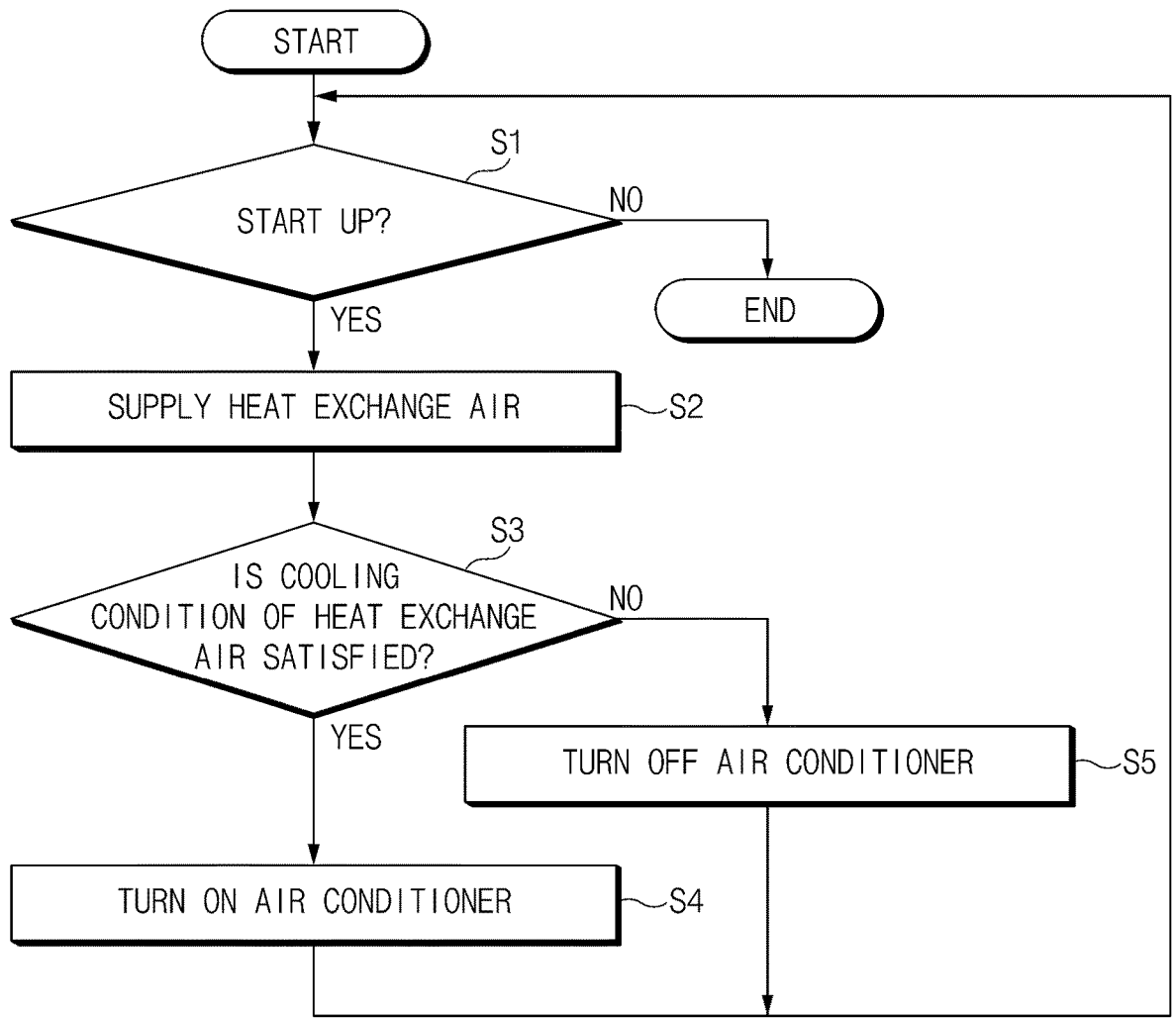
FIG. 3 is a flowchart for describing an air supply method for a fuel cell according to another embodiment of the present disclosure.

FIG. 3 is a flowchart for describing an air supply method for a fuel cell according to another embodiment of the present disclosure.

Referring to FIG. 3, the air supply method for a fuel cell according to another embodiment of the present disclosure may include a start-up identifying operation S1, a heat exchange air supplying operation S2, a heat exchange air cooling condition satisfaction determining operation S3, a vehicle air conditioner operating operation S4, and a vehicle air conditioner stopping operation S5.

The start-up identifying operation S1 may include an operation of identifying whether a vehicle is started up.

When it is determined in the start-up identifying operation S1 that the vehicle is started up, the heat exchange air supplying operation S2 may be performed.

Meanwhile, when the starting of the vehicle is not identified in the start-up identifying operation S1, the air supply method for a fuel cell according to another embodiment of the present disclosure may be terminated.

The heat exchange air supplying operation S2 may include an operation of supplying the heat exchange air from the indoor temperature adjustment device 30 (hereinafter, a vehicle air conditioner) to the air supply device 10 and an operation of cooling the power generation air provided to the fuel cell stack 20 using the heat exchange air by the air supply device 10.

In this case, the air supply device 10 may compress the external air, may primarily cool the compressed air using the cooling water by the air cooler 13, may secondarily cool the air using the heat exchange air by the heat exchanger 14, and may provide the cooled air to the fuel cell stack 20.

The heat exchange air cooling condition satisfaction determining operation S3 may include an operation of determining whether the power generation air may be cooled to a temperature required by the fuel cell stack 20 using the heat exchange air having the temperature of the external air.

For example, in the heat exchange air cooling condition satisfaction determining operation S3, when it is determined (YES) that the power generation air cannot be cooled to the temperature required by the fuel cell stack 20 only using the external air, the vehicle air conditioner operating operation S4 may be performed.

In this case, in the heat exchange air cooling condition satisfaction determining operation S3, when the temperature $T_{Ambient}$ of the external air exceeds a value of $T_{ACL,out} - 1/\eta^*(T_{ACL,out} - T_{AHF,in})$(YES), it is determined that the power generation air may not be cooled to the temperature required by the fuel cell stack 20 only using the external air, and thus the vehicle air conditioner operating operation S4 may be performed.

Meanwhile, in the heat exchange air cooling condition satisfaction determining operation S3, when it is determined (NO) that the power generation air may be cooled to the temperature required by the fuel cell stack 20 using the heat exchange air having the temperature of the external air, the vehicle air conditioner stopping operation S5 may be performed.

In this case, in the heat exchange air cooling condition satisfaction determining operation S3, when the temperature $T_{Ambient}$ of the external air is less than or equal to the value of $T_{ACL,out} - 1/\eta^*(T_{ACL,out} - T_{AHF,in})$(NO), it is determined that the power generation air may be cooled to the temperature required by the fuel cell stack 20 using the heat exchange air having the temperature of the external air, and thus the vehicle air conditioner stopping operation S5 may be performed.

In the formula of $T_{ACL,out} - 1/\eta^*(T_{ACL,out} - T_{AHF,in})$, $\eta$ may mean heat transfer efficiency of the heat exchanger 14, $T_{ACL,oUt}$ may mean the temperature of the air output from the air cooler 13, $T_{AHF,in}$ may mean the temperature of the air provided to the humidifier 15, and the heat transfer efficiency of the heat exchanger 14 may be a preset value at the time of design.

The vehicle air conditioner operating operation S4 may include an operation of cooling the external air and providing the cooled air as the heat exchange air.

The vehicle air conditioner stopping operation S5 may include an operation of providing the sucked external air as the heat exchange air.

After the vehicle air conditioner operating operation S4 and the vehicle air conditioner stopping operation S5 are performed, the start-up identifying operation S1 may be performed again.

As a result, in the air supply method for a fuel cell according to another embodiment of the present disclosure, when the external air is compressed, the temperature of the compressed air is reduced, and the air is provided as the power generation air to the fuel cell stack 20, it is determined whether the power generation air may be cooled to the temperature required by the fuel cell stack 20 only using the external air, and thus it may be determined whether to operate a vehicle air conditioner.

Further, in the air supply method for a fuel cell according to another embodiment of the present disclosure, when the power generation air cannot be cooled to the temperature required by the fuel cell stack only using the external air, the vehicle air conditioner may be operated to cool the power generation air using the heat exchange air having a temperature lower than that of the external air.

The present technology has an advantage in that power generation efficiency of a fuel cell may be increased by controlling a temperature of air supplied to a fuel cell.

An aspect of the present disclosure provides an air supply system and an air supply method for improving power generation efficiency of a fuel cell.

The air supply device 10, the indoor temperature adjustment device 30, the controller 40, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, afield-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the air supply method for a fuel cell. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An air supply system for a fuel cell, the air supply system comprising:
   an air supply device configured to reduce a temperature of compressed air using heat exchange air and to provide cooled air as power generation air to a fuel cell stack;
   an indoor temperature adjustment device configured to provide external air as the heat exchange air to the air supply device or to cool the external air to provide the cooled external air as the heat exchange air to the air supply device, based on operation control information for determining whether to perform a cooling operation; and
   a controller configured to generate the operation control information,
   wherein the air supply device comprises:
      an air compressor configured to compress the external air;
      an air cooler configured to cool the air compressed by the air compressor using cooling water; and
      a heat exchanger configured to cool the air cooled by the air cooler using the heat exchange air,
   wherein the indoor temperature adjustment device further comprises:
      a blower motor configured to suck the external air; and
      a distributor configured to provide, to the air supply device, the external air
      sucked by the blower motor or the external air cooled by the evaporator as the heat exchange air, and
   wherein the controller is configured to generate the operation control information based on a temperature of the air cooled by the air cooler, a temperature of the air cooled by the heat exchanger, heat transfer efficiency of the heat exchanger, and a temperature of the external air.

2. The air supply system of claim 1, wherein the air supply device further comprises:
   an air filter configured to remove a pollutant from the external air and to provide, to the air compressor, the external air from which the pollutant source is removed; and
   a humidifier configured to add moisture to the air cooled by the heat exchanger and to provide, to the fuel cell stack, the air to which the moisture is added.

3. The air supply system of claim 1, wherein the indoor temperature adjustment device comprises a condenser, an expansion valve, an evaporator, and a compressor of which operations are determined based on the operation control information.

4. The air supply system of claim 1, wherein the controller is further configured to determine whether a temperature of the power generation air is reduced to a temperature needed by the fuel cell stack only using the external air based on the temperature of the air cooled by the air cooler, the temperature of the air cooled by the heat exchanger, the heat transfer efficiency of the heat exchanger, and the temperature of the external air, and to provide a result of the determination as the operation control information to the indoor temperature adjustment device.

5. The air supply system of claim 1, wherein the controller is further configured to determine that the temperature of the power generation air is not cooled to a temperature needed by the fuel cell stack only using the external air, in response to the temperature of the external air exceeding a value of the following formula $T_{ACL,out} - 1/\eta *(T_{ACL,out} - T_{AHF,in})$, wherein $\eta$ is the heat transfer efficiency of the heat exchanger, $T_{ACL,out}$ is the temperature of the air cooled by the air cooler, and $T_{AHF,in}$ is the temperature of the air cooled by the heat exchanger, and to generate the operation control information so that the external air is cooled and provided as the heat exchange air to the air supply device.

6. The air supply system of claim 5, wherein the controller is further configured to determine that the temperature of the power generation air is cooled to the temperature needed by the fuel cell stack only using the external air, in response to the temperature of the external air being less than or equal to the value of the following formula $T_{ACL,out} - 1/\eta * (T_{ACL,out} - T_{AHF,in})$, and to generate the operation control information so that the external air is provided as the heat exchange air to the air supply device.

7. A processor-implemented air supply method for a fuel cell, the method comprising:
   identifying whether a vehicle is started up;
   supplying heat exchange air to an air supply device, in response to the startup of the vehicle being identified;
   determining whether a cooling condition of the heat exchange air is satisfied;
   supplying the heat exchange air having a temperature lower than that of external air to the air supply device by operating a vehicle air conditioner, in response to the cooling condition of the heat exchange air being satisfied; and
   determining whether the vehicle is started up, in response to the supplying of the heat exchange air having the temperature lower than that of the external air,
   wherein the air supply device comprises:
      an air compressor configured to compress the external air;
      an air cooler configured to cool the air compressed by the air compressor using cooling water; and
      a heat exchanger configured to cool the air cooled by the air cooler using the heat exchange air and provide the cooled air to a fuel cell stack,
   wherein the determining of whether the cooling condition of the heat exchange air is satisfied comprises determining whether the cooling condition of the heat exchange air is satisfied based on a temperature of the air cooled by the air cooler, a temperature of the air cooled by the heat exchanger, heat transfer efficiency of the heat exchanger, and a temperature of the external air, and wherein the determining of whether the cooling condition of the heat exchange air is satisfied comprises:
  determining whether a temperature of the power generation air is reduced to a temperature needed by the fuel cell stack only using the external air based on the temperature of the air cooled by the air cooler, the temperature of the air cooled by the heat exchanger, the heat transfer efficiency of the heat exchanger, and the temperature of the external air, and
  providing a result of the determination as the operation control information to the indoor temperature adjustment device.

8. The air supply method of claim 7, wherein the determining of whether the cooling condition of the heat exchange air is satisfied comprises supplying the heat exchange air having a temperature lower than that of the external air to the air supply device, in response to the temperature of the external air exceeds a value of the following formula $T_{ACL,out} - 1/\eta*(T_{ACL,out} - T_{AHF,in})$, wherein $\eta$ is the heat transfer efficiency of the heat exchanger, $T_{ACL,out}$ is the temperature of the air cooled by the air cooler, and $T_{AHF,in}$ is the temperature of the air cooled by the heat exchanger.

9. The air supply method of claim 8, wherein the determining of whether the cooling condition of the heat exchange air is satisfied further comprises supplying the external air as the heat exchange air to the air supply device, in response to the temperature of the external air being less than or equal to the value of the following formula $T_{ACL,out} - 1/\eta*(T_{ACL,out} - T_{AHF,in})$.

* * * * *